(12) United States Patent
Guerineau et al.

(10) Patent No.: US 8,150,577 B2
(45) Date of Patent: Apr. 3, 2012

(54) MODULAR DEVICE FOR TURNING ON THE POWER SUPPLY OF AN ELECTRONIC ITEM OF EQUIPMENT IN A SECURE MANNER

(75) Inventors: Olivier Guerineau, Andernos (FR); Christian Lereverend, Cestas (FR); Didier Bergougnoux, Merignac (FR); Patrice Eudeline, Bordeaux (FR)

(73) Assignee: Thales, Neuilly Sur Seine (FR)

( * ) Notice: Subject to any disclaimer, the term of this patent is extended or adjusted under 35 U.S.C. 154(b) by 457 days.

(21) Appl. No.: 12/400,060

(22) Filed: Mar. 9, 2009

(65) Prior Publication Data

US 2009/0253371 A1    Oct. 8, 2009

(30) Foreign Application Priority Data

Mar. 7, 2008 (FR) ...................................... 08 01273

(51) Int. Cl.
*H04Q 3/00* (2006.01)
(52) U.S. Cl. ........................ 701/32.2; 244/194
(58) Field of Classification Search .................... 701/35, 701/3–5, 7–10, 14, 32.2; 455/26.1; 307/112, 307/116; 725/18, 20; 340/3.1, 945, 500; 244/194
See application file for complete search history.

(56) References Cited

U.S. PATENT DOCUMENTS

| | | | |
|---|---|---|---|
| 4,626,996 A * | 12/1986 | Arlott | 701/14 |
| 4,943,919 A * | 7/1990 | Aslin et al. | 701/3 |
| 5,111,402 A * | 5/1992 | Brooks et al. | 701/35 |
| 5,872,827 A | 2/1999 | Eudeline et al. | |
| 6,570,355 B2 * | 5/2003 | Morita et al. | 318/563 |
| 6,757,252 B1 | 6/2004 | Eudeline et al. | |
| 2001/0027352 A1 | 10/2001 | Morita et al. | |
| 2003/0032426 A1 * | 2/2003 | Gilbert et al. | 455/427 |

FOREIGN PATENT DOCUMENTS

| | | |
|---|---|---|
| EP | 1460497 A | 9/2004 |
| EP | 1705539 A | 9/2006 |
| WO | WO-89/02124 A | 3/1989 |

\* cited by examiner

*Primary Examiner* — Dalena Tran
(74) *Attorney, Agent, or Firm* — Stroock & Stroock & Lavan LLP

(57) ABSTRACT

The present invention relates to a device making it possible to turn on a sub-assembly of an electrical item of equipment hosted in a bigger system, which, if turned on unchecked, may impair the operation of the other items of equipment of the system. An embodiment includes three make/break switches in series in the power supply line and a control of the opening or closing of these make/break switches. Two of the make/break switches are controlled by two independent discrete state indicators, to determine whether the power supply of the sub-assembly of the item of equipment may be energized without undue risk to other equipment of the system. The third make/break switch is controlled by a validation command based on the two discretes, actuating the third make/break switch only if the discretes are in the desired state and if a switching of these discretes has been noted. An embodiment of the invention applies to the protection of the onboard equipment of an aircraft in the flight phase against the turning on of ancillary equipment not used in the flight phase and transmitting radioelectric waves that may catastrophically impair the operation of the other items of equipment.

12 Claims, 2 Drawing Sheets

MODULAR DEVICE FOR TURNING ON THE POWER SUPPLY OF AN ELECTRONIC ITEM OF EQUIPMENT IN A SECURE MANNER

CROSS-REFERENCE TO RELATED APPLICATION

The present application claims the benefit of French patent application serial No. 08 01273, filed Mar. 7, 2008 which is hereby incorporated by reference in its entirety.

FIELD OF THE INVENTION

The present invention relates to the general field of the safety of operation of sensitive electrical and electronic systems. It relates notably to the field of the security of operation of electrical and electronic systems fitted to aircraft, civilian in particular, and more particularly to the protection of onboard equipment against the untimely transmission of radio waves. Its domain of application is nevertheless not limited to this field alone.

CONTEXT OF THE INVENTION—PRIOR ART

Nowadays, there are numerous technical fields in which it is usual for one and the same system to include items of equipment which, when operating or simply through the action of turning them on, may prove to be harmful for the proper operation of the other items of equipment of the system. Accordingly, it may prove to be useful to temporally separate the operating phases of the various items of equipment and to completely control the state (on or off) of this or that item of equipment which could potentially disturb the general operation of the system during the latter's various operating phases.

Such is the case in particular for the electronic navigation equipment of an aircraft, the operation of which may be impaired by untimely radioelectric transmissions originating from particular items of equipment the operation of which is moreover not necessary for the nominal working operation of the system. These transmissions may in particular disturb the operation of the navigation system of the aircraft while the latter is in flight, rolling on the ground, or worse still, while the latter is performing critical takeoff or landing manoeuvres.

For potentially disturbing items of equipment such as these, it is known to provide particular control means allowing the operator or the automatic facility which manages the operation of the system, not to actually power up the disturbing sub-assemblies accommodated within these items of equipment except in the operating phases which are allotted to them, during which phases their operation cannot have harmful, or indeed catastrophic, consequences for the general operation of the system.

The control means used must therefore themselves check that power-up of the disturbing sub-assembly integrated into the item of equipment considered is indeed performed only in the scheduled phases and that no exterior disturbance or failure can enable untimely powering up of this sub-assembly. Accordingly it is known practice to make the operator or the automatic management facility of the system aware of events which allow him, or it, to ensure that the system considered is in an operating phase compatible with the powering up of the potentially disturbing sub-assembly.

These events are generally translated into electrical state signals, the value of which signals is tested prior to powering up the sub-assembly. Various known technical means, not described here, based for example on logic circuits optionally associated with sensors and with relays, allow the operator or the automatic management facility to ensure that the sub-assembly can be powered up without danger.

Accordingly, these events must be known and measured with certainty and the failure of the corresponding state indicators, also called "discretes", must be detected perfectly, in particular if the failed indicator is stuck in a logic state which may lead the operator or the system management facility to consider wrongly that it is possible, or even necessary, to power up the disturbing sub-assembly.

The overall degree of safety of the system depends on this control. Unless it is possible to guarantee that the potentially disturbing sub-assembly can actually be brought into service, powered up, only when the operation thereof has no consequence for the operation of the system, it is sometimes essential, in order to comply with the desired safety level, to provide means of isolation, of confinement, making it possible to eliminate or at least to limit as far as possible, the disturbing effects of the offending sub-assembly on the other items of equipment of the system. In this way, if by misfortune the offending sub-assembly is wrongly powered up, the disturbances caused will be sufficiently attenuated as not to compromise the safety of operation of the system.

SUMMARY OF THE INVENTION

An aim of the invention is to solve this general safety problem and to enable the integration of potentially disturbing items of equipment into a system with high degree of safety without needing to install isolation means which by their very nature are sophisticated and cumbersome and generally only partially effective.

For this purpose the subject of the invention is a device for ensuring the secure power supply of a sub-assembly integrated into an item of equipment. The device according to an embodiment of the invention is able to receive a first and a second discrete relating to a first and a second state cue characterizing the operating phase at the instant considered of the system incorporating the item of equipment considered. It includes a power supply line making it possible to link the sub-assembly considered to an appropriate power supply source, as well as three controlled make/break switches, arranged in series along the power supply line. A first and a second make/break switch are actuated to the "open" or "closed" position according to the "0" or "1" logic state of the first and of the second discrete. A third make/break switch is actuated by a validation command, the setting of which to the active state results from the "0" or "1" logic states of the first and of the second discrete and of the analysis of the ability of the said discrete to change state.

According to a preferred embodiment, the device according to the invention includes the means for synthesizing the validation command in an autonomous manner.

According to this embodiment, the means for generating the validation command includes means for detecting a change of state of the first and of the second discrete and the toggling of the said discretes to an expected state determined by the predefined binary configuration cue values as well as for verifying the mutual consistency of these detected changes of state; the said means generating a binary validation cue whose value characterizes the result of the detection and of the consistency verification.

According to a variant of this embodiment, the means for generating the validation command includes three parallel detection lines, each line itself comprising means for detecting a change of state of the first and of the second discrete and for verifying the mutual consistency of these detected changes of state. These means generate a binary validation cue whose value characterizes the result of the detection and of the consistency verification. The cues produced by each of the lines are sent to validation means for checking the consistency of these cues and responsible for generating the corresponding validation command.

According to a mode of implementation of this variant, the validation means produce a validation command whose logic state is dependent on the logic state taken by the majority of the validation cues produced by each of the detection lines.

According to another mode of implementation of this variant the validation means produce a validation command whose logic state is dependent on the product of the logic states taken by the validation cues produced by each of the detection lines.

According to this variant, the device according to the invention furthermore includes means for checking the parity of the binary configuration cues, the said means producing a binary signal indicating whether the parity check is positive or negative, the said binary signal being sent to the validation means, the value of the validation command produced by the validation means being dependent on the result of the parity check performed.

According to a variant embodiment, the device according to the invention furthermore includes means for adapting the coding logic for the input discretes to its internal coding logic.

According to a variant embodiment, the device according to the invention furthermore includes means for effecting the electrical adaptation of the discretes.

According to a variant embodiment, the device according to the invention furthermore includes means for synthesizing and sending a binary cue of proper operation of the control chain of the three make/break switches, the cue being synthesized by analyzing the consistency of the commands applied to the make/break switches and by analyzing the proper operation of the means for generating the validation command.

The object of the invention is also the application of the device according to the invention to the secure turning on of the power supply of a transmitter-receiver fitted to a flight data recorder placed in an aircraft, the said transmitter-receiver being used to send the recorded flight data only when the aircraft is parked.

BRIEF DESCRIPTION OF THE DRAWINGS

The characteristics and advantages of the invention will be better appreciated by virtue of the description which follows, which description sets out one or more embodiments of the invention through a particular application taken as nonlimiting example and which is supported by the following appended figures.

DETAILED DESCRIPTION

Figure 1:
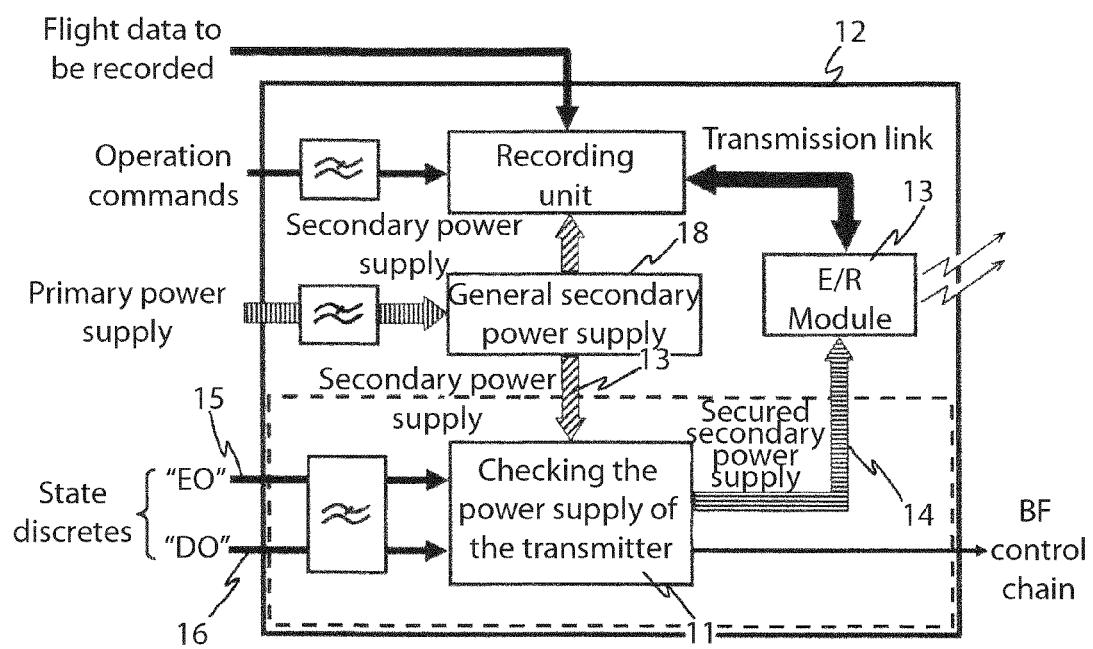
FIG. 1, a general schematic of the item of equipment taken as example for presenting the characteristics of the device according to the invention.

Attention is initially turned to FIG. 1, which illustrates the advantageous nature of the invention through a particular example application, which example is nonlimiting of the scope of the invention.

In this example application, the device according to the invention 11 is integrated into an aircraft flight data recording item of equipment 12. This item of equipment is itself integrated into a bigger electrical and electronic system grouping together the onboard instrumentation of the aircraft and the items of equipment responsible for elabortaing the flight commands.

For eminently practical reasons of unloading the memory of the recorder the latter may be provided, as is the case in the example, with communication means, a transmitter-receiver 13, making it possible in particular to read the recorded data without having to extract the recorder from the system. It is thus advantageously possible to effect a transfer of data through a radioelectric link between the recorder and a distant scrutinizing system situated remotely from the aircraft without having to remove the recorder and take it away. However, it is then necessary to ensure that the radioelectric transmission has no impact on the proper operation of the remainder of the equipment of the general electrical system of the aircraft and that in particular these radioelectric transmissions are not liable to impair the operation of equipment whose failure would seriously compromise the safety of operation of the aircraft. This is why the power supply 14 of the transmitter-receiver 13 is here ensured only when the aircraft is in a situation where these transmissions cannot be detrimental to its operation or to the operation of aircraft situated nearby. Such is the case in particular when the aircraft is stationary in its parking zone. To control the application of a power supply voltage to the input of the transmitter-receiver 13, the recorder 12 presented here integrates a device 11 according to an embodiment of the invention, configured so as to establish the power supply 14 of the transmitter-receiver 13 only during this particular phase. The device 11 according to the an embodiment of invention therefore plays the role of an intelligent switch inserted into the power supply line of the transmitter-receiver 13.

According to an embodiment of the invention, here the power supply 14 is established by the device 11 when the latter recognizes an operating phase of the system into which the item of equipment 12 is integrated for which the turning on of the transmitter-receiver 13, which here constitutes the sub-assembly the turning on of which it is desired to make secure, is of no consequence. In the example application chosen the phase in question is that during which the aircraft is stationary in its parking location. During this phase in fact most onboard items of equipment of the aircraft are unused and their possible disturbance by the transmitter-receiver 13 of the recorder 12 does not pose any safety problem.

To detect this particular operating phase, the device 11 according to an embodiment of the invention tests two indicators whose values make it possible to determine whether or not the operating phase considered permits the disturbing sub-assembly to be turned on.

Thus in the example of FIG. 1, the particular operating phase during which the aircraft is stationary in its parking location is determined by testing two independent static electrical signals or "discretes", whose "1" or "0" logic state advises the device on the fact that the aircraft is or is not in this phase. The discretes considered here are for example a first discrete 15 "EO" (for "engines off") indicating that the aircraft's engines are shut down and a second discrete 16 "DO" (for "Door Open") indicating that the aircraft's exits are open. These two discretes provide the device according to an embodiment of the invention with independent cues which, validated simultaneously, certify that the aeroplane is indeed parked and stationary and that consequently the sub-assembly 13 can be supplied.

Figure 2:
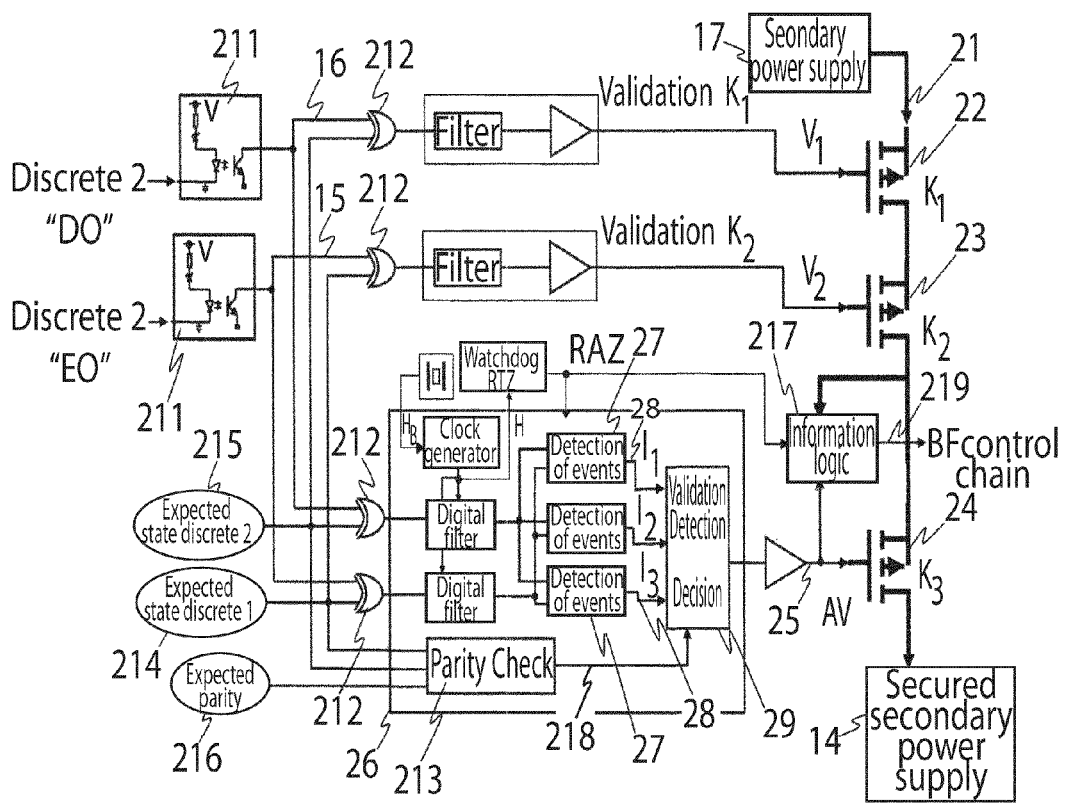
FIG. 2, a general schematic of a particular embodiment of the device according to the invention; embodiment corresponding to the item of equipment taken as example illustrated by FIG. 1.

Attention is now turned to FIG. 2 which depicts the general architecture of the device according to the invention, seen through the application taken as example.

To fulfil its function, the device 11 according to an embodiment of the invention includes an assembly of means making it possible to ensure that:

the potentially disturbing sub-assembly, the transmitter-receiver 13 here, can only be turned on, or indeed simply powered up in a given operating phase of the system, which operating phase is non-critical in terms of safety of operation of the aircraft. This phase being identified by the value of the discretes provided to the device 11.

the reliability of the cues manifested by the discretes provided to the device, is sufficient to guarantee a given failure rate. Here, failure is exhibited by the accidental turning on of the sub-assembly during a critical phase in terms of security. Here the expression critical phase is understood to mean a phase during which if certain items of equipment of the system are affected by the disturbing sub-assembly, the safety of the whole system assembly is seriously compromised.

For this purpose the device 11 according to an embodiment of the invention includes three controlled make/break switches 22, 23 and 24, symbolized by MOSFETS circuits in FIG. 2. These make/break switches are arranged in series along the power supply line 21 in such a way that only the simultaneous closing of the three make/break switches makes it possible to supply the potentially disturbing sub-assembly, here the transmitter-receiver 13. According to an embodiment of the invention, the assembly is configured in the following manner:

Two of the three make/break switches 22, 23 are directly actuated by way of the discretes 15 and 16 corresponding to the cues chosen to determine the non-critical phase, here the cues EO and DO. According to the state of the discrete EO or DO associated therewith, each of the two make/break switches 22 or 23 is thus actuated to the "Closed" or "Open" position. In this way when the combination of the cues "Door Open"="True" and "Engine Off"="True" is realized the first two make/break switches 22 and 23 are closed. On the other hand, if one of the two cues is not satisfied, one of the make/break switches remains open.

The third make/break switch 24 is actuated by a validation command 25. According to an embodiment of the invention this command is itself mainly synthesized by a sub-assembly 26 comprising appropriate means 27, 29 and 213.

According to an embodiment of the invention, the validation is conditioned by the fact that the discretes provided to the device are reliable. The solution adopted for testing this reliability includes testing at one and the same time the correspondence of the logic state of the discretes 15 and 16 associated with the first two make/break switches with an expected logic state and of the existence of a change of state of the said discretes between the moment when these discretes are in logic states causing the first two make/break switches to close simultaneously and the period preceding this moment.

The logic synthesis of the binary signal 25 corresponding to the validation command thus defined may be performed by any appropriate means, logic integrated circuits for example. In this way, when the discretes 15 and 16, here "EO" and "DO", are in the expected logic state, active logic state, and a change of state has been detected for each of these discretes, the validation command 25 is set to the active logic level which actuates the closing of the third make/break switch 24, the "1" or "0" level according to the nature of the make/break switch. When, subsequently, one of the discretes 15 and 16 reverts from the "active" state to the "inactive" state, the means for detecting the changes of state of the discretes are reinitialized and the validation command 25 is repositioned to the "inactive" state so that the make/break switch 24 is reopened. The detection of a new change of state of the discretes is then necessary so that the command 25 is again set to the active state.

According to the type of application considered and the degree of criticality which characterizes the turning on the disturbing sub-assembly 13, the structure of the sub-assembly 26 may be more or less complex.

Thus in the example application presented here in support of the description, which example is moreover nonlimiting of the scope of the invention, the untimely turning on of the transmitter-receiver 13 fitted to the flight data recorder 11 which integrates the device according to the invention assumes a particularly critical character in that it may lead to the operation of the onboard items of equipment of the aircraft being seriously impaired. This is why here the sub-assembly 26 includes three independent decision lines, each line itself comprising a circuit 27 carrying out in an independent manner the synthesis of a logic validation cue 28, in the manner described above. The sub-assembly 26 also includes a complementary element 29, a logic circuit, which receives the three synthesized validation cues 28 and whose function includes producing a validation command 25 corresponding to a synthesis of the three cues.

According to the application considered the synthesis logic implemented may correspond to more or less constraining validation conditions.

It may, for example, consist in setting the command 25 to its active state "1" or "0" when the three cues 28 are in one and the same logic state, "1" or "0" which permits the disturbing item of equipment 13 to be turned on, and in setting the command 25 to its inactive state if at least one of the three cues is in a converse logic state, not permitting turn-on (principle of the unanimous vote). The value of the validation command 25 is then dependent on that of the logical product of the states of the cues 28 provided by the three pathways. Stated otherwise if the cues 28 provided by the three pathways are called $I_1$, $I_2$ and $I_3$ and the validation command 25 is called AV, it is possible to write: $AV = I_1 \cdot I_2 \cdot I_3$.

Alternatively, the synthesis logic may, for example, consist in setting the command 25 to its active state, "1" or "0" according to the application, when the three cues 28 are in one and the same logic state, "1" or "0" which permits the disturbing item of equipment 13 to be turned on, or else when two of the three cues 28 are in this state. In this alternative the command 25 is set to its inactive state if at least two of the three cues are in a converse logic state, not permitting turn-on (principle of the majority vote). The value of the validation command 25 is then dependent on that of the sum of the logical products of the states of the cues 28 provided by the three lines, taken pairwise. Stated otherwise, reusing the above notation, it is possible to write: $AV = I_1 \cdot I_2 + I_1 \cdot I_3 + I_2 \cdot I_3$.

Placing several check circuits 27 in parallel, three circuits in the case of the example application set forth here, simultaneously processing the same discretes 15 and 16 so as to provide a validation cue 28, has the advantageous effect of making the whole assembly of the device 11 operate securely. Specifically, the synthesis of the validation command 25 is carried out by a sub-assembly 26 generally consisting of an arrangement of electronic logic functions. These logic functions may themselves be prone to operating failures caused by aging or else by external disturbances such as electromagnetic disturbances or else radiation, solar radiation for example. The consequence of these failures is naturally liable to diversely impair the operation of the sub-assembly 26. However, by performing, in parallel, separate checks of the change of state of the two discretes 15 and 16 by means of several circuits, it is possible to detect by comparing the cues 28 synthesized by the various circuits 27 implemented, whether any impairment has occurred. Accordingly, the detected impairment leading to the consideration that the cues 28 provided are not secure, it is possible to maintain the validation command 25 in the inactive state, which state maintains the third make/break switch 24 in the open position.

The particular configuration of the device according to an embodiment of the invention, with two make/break switches actuated by way of independent discretes accounting for the state of the system in which the item of equipment comprising the device according to an embodiment of the invention is integrated and a make/break switch actuated by way of a command synthesized locally on the basis of these two discretes, constitutes an advantageous alternative solution to a more conventional configuration where the three make/break switches $K_1$, $K_2$ and $K_3$ are controlled by way of three independent discretes. It makes it possible notably to limit the number of discretes required for the operation of the device and hence to limit the number of sensors involved as well as the number of electrical or other links required for trunking the discretes produced by these sensors up to the item of equipment enclosing the device. It therefore makes it possible to limit the influence of the potential impairments that may be undergone by the sensors as well as by the links conveying the discretes, on the proper operation of the device and hence, on the security of operation of the system.

The elements forming the basic structure of the device according to an embodiment of the invention, the structure described in the foregoing paragraphs, constitute the means characteristic of the device according to an embodiment of the invention. However, this basic structure is in practice supplemented, as illustrated by FIG. 2, with means making it possible to easily ensure the interface between the device and the other items of equipment of the system, notably means 211 for effecting the electrical adaptation of the discretes 15 and 16 to the input of the device. These means may be various and implement, as illustrated by FIG. 2, optoelectronic elements for example, or else isolating elements of transformer type. The nature of the interface element depends in particular on the form (voltage, current, or simple contact) in which the discrete is conveyed from the sensor considered by the wiring of the system.

The basic structure may also be supplemented with means 212 for effecting in a simple manner the adaptation of the coding logic of the discretes 15 and 16, coding by positive or negative logic, to the internal coding logic for the device, in particular to the control logic for the make/break switches 22, 23 and 24. These means 212 can consist, as illustrated by FIG. 2, of logic functions of "Exclusive OR" (or "EXOR") type, combining each discrete considered with a configuration cue 214 or 215, whose state is fixed so as to ensure adaptation. These configuration cues 214 and 215 may for example be fixed by wiring or alternatively by programming a configuration logic circuit.

Additionally to the means 212, the device according to an embodiment of the invention can also include means 213 carrying out a logic function intended to guarantee that the configuration cues 214 and 215 are set to the proper values. This logic function performs a simple parity calculation on the real values of the two configuration cues and compares the result with a binary fixed cue 216 whose value "0" or "1" is determined by calculating the parity of the expected values for the two cues 214 and 215. The result of the comparison is sent in the form of a binary signal 218 to the circuit 29 responsible for synthesizing the validation command 25 for the third make/break switch 24. Depending on whether the result of the comparison is positive or negative, the circuit 29 does or does not permit the validation command 25 to toggle to the active state and consequently the make/break switch 24 to close or to remain in the "open" state.

It should be noted that, as described above, the device according to an embodiment of the invention, exhibit all the means necessary for ensuring, with the degree of security desired, the powering up, or more generally the power supply, of the potentially disturbing sub-assembly. It therefore advantageously meets the requirements imposed. However it may advantageously be provided with an additional functionality allowing it to communicate to the item of equipment in which it is housed and, as a consequence, to the general system which includes this item of equipment a cue relating to the fact that the operation of the control chain of the three make/break switches is in the working state or else that it exhibits an operating anomaly. For this purpose it may include complementary checking means 217 which synthesize and deliver a binary cue 219 of proper operation of the control chain. According to an embodiment of the invention, this cue takes into account the overall consistency of the commands applied to the make/break switches and the proper operation of the means (26) for generating the validation command (25). It is synthesized as a function of the following events:

a) state of the closure of the chain of the make/break switches K1 and K2. This state can be "active", this corresponding to the combined closure of the make/break switches K1 and K2, or else "inactive", which state corresponds to the opening of at least one make/break switch K1 or K2 b) state of the validation command AV (25). This state can be "active", this corresponding to the validation synthesis (switching noted of the discretes 15 and 16, consistency satisfied) or else "inactive" in the converse case.

c) state of the validation means (26) responsible for synthesizing the validation command 25. This state is "inactive" if the watchdog device detects an absence of operation of the validation means (26). The "active" state indicates the proper operation of these means.

Thus in the case where the three required conditions a), b) and c) are fulfilled simultaneously (the above three events are in the "active" state) the cue of proper operation of the control chain is set to the "true" state, informing the system that operation is correct. Likewise, if the required conditions a) and b) are not simultaneously fulfilled and the required condition c) is fulfilled, the cue of proper operation of the control chain is also set to the "true" state, informing the system that operation is correct.

On the other hand, if condition a) is fulfilled while simultaneously condition b) is not fulfilled, or if condition a) is not fulfilled while simultaneously condition b) is fulfilled, or else if condition c) is not fulfilled, then the cue of proper operation of the control chain is set to the "false" state, informing the system that the operation of the control chain is impaired.

The synthesis of the cue of proper operation as a function of the validation of conditions a), b) and c) can be carried out by any known means. In the example of FIGS. 1 and 2, the implementation of the synthesis of the cue of proper operation 219 is carried out, as illustrated by FIG. 2, by a logic circuit 217 on the basis of the detection of the presence of the power supply voltage downstream of the second make/break switch 23, of the state of the validation command 25 of the third make/break switch and of the state of an "RTZ" command delivered by a "watchdog" circuit which checks, in a conventional manner, the proper operation of the internal clock H of the circuit 26 which effects the synthesis of the validation command 25.

Accordingly, the cue of proper operation of the control chain of the make/break switches is set to the "true" state (1 or 0 as the case may be) as soon as a voltage is present on the power supply line 21 downstream of the second make/break switch 23 and upstream of the third 24, as the validation command 25 is in the active state, which state causes the third make/break switch to close, and the "RTZ" command is not activated. The same holds if no voltage is present on the power supply line 21 downstream of the second make/break switch 23 and upstream of the third 24, the validation command 25 is in the inactive state (third make/break switch open), and the "RTZ" command is not activated.

Conversely, the cue of proper operation of the control chain of the make/break switches is set to the "false" state (0 or 1 as the case may be) as soon as a voltage is present on the power supply line 21 downstream of the second make/break switch 23 and upstream of the third 24 and the validation command 25 is not in the active state or as soon as no voltage is present on the power supply line 21 downstream of the second make/break switch 23 and upstream of the third 24 and the validation command 25 is in the active state or else as soon as the "RTZ" command is activated, indicating improper operation of the circuit 26. The same holds if no voltage is present on the power supply line 21 downstream of the second make/break switch 23 and upstream of the third 24 while the validation command 25 is in the active state and the "RTZ" command is not activated.

It should be noted here that although the device according to the invention is described in the foregoing as comprising means for taking into account two cues, two discretes, relating to the operation of the system that one seeks to protect from the untimely turning on of a sub-assembly. It is quite obvious, however, that this description does not exclude from the field of the invention the variants of the device making it possible to take into account according to the same principle a greater number of cues, because for example the operating phase of the system allowing the sub-assembly considered to be turned on cannot be identified by the state of two cues alone.

What is claimed is:

1. A device for ensuring a secure power supply of a sub-assembly integrated into an item of equipment, the device comprising:
    a power supply line linking the sub-assembly to a power supply source;
    an interface to receive a first and a second discrete state indicator relating to a first and a second state cue, the first and second state cues characterizing an operating phase of a system incorporating the item of equipment; and
    a first, a second, and a third controlled make/break switch, arranged in series on the power supply line, wherein:
    the first and the second make/break switch are actuated to an "open" or "closed" position based on a "0" or "1" logic state of said first and second discrete state indicator; and
    the third make/break switch is actuated by a validation command based on the "0" or "1" logic states of said first and second discrete state indicator and an ability of the first and second discrete state indicator to change state.

2. The device of claim 1, further comprising a circuit to synthesize the validation command in an autonomous manner.

3. The device of claim 2, wherein the circuit to synthesize the validation command comprises:
    a detector to detect a change of state of said first and second discrete state indicator and a toggling of said discrete state indicators to an expected state determined by predefined binary configuration cue values; and
    a verification circuit to verify a mutual consistency of the detected changes of state,
    wherein the circuit to synthesize the validation command produces a binary validation cue having a value dependent upon the result of the detected changes of state and the result of the verification of the mutual consistency of the detected changes of state.

4. The device of claim 2, wherein the circuit to synthesize the validation command comprises:
    three parallel detection lines, each line producing a binary validation cue, each line comprising:
        a detector to detect a change of state of said first and second discrete state indicator; and
        a verification circuit to verify a mutual consistency of the detected changes of state, wherein:
        each binary validation cue has a value dependent upon the result of the detected changes of state and the result of the verification of the mutual consistency of the detected changes of state; and
        each binary validation cue is validated by a check of these cues, to generate the validation command.

5. The device of claim 4, wherein the validation command has a logic state that is dependent on a logic state taken by a majority of the validation cues produced by each of the three parallel detection lines.

6. The device of claim 4, wherein the validation command has a logic state that is dependent on a Boolean product of logic states taken by the validation cues produced by each of the three parallel detection lines.

7. The device of claim 4, further comprising a parity checker checking the parity of the binary configuration cues, to produce a result comprising a binary signal that indicates whether the parity check is positive or negative, the binary signal provided to the circuit to synthesize the validation command, the value of the validation command produced by the circuit to synthesize the validation command dependent on the result of the parity check.

8. The device of claim 4, wherein the item of equipment comprises a secure equipment for turning on a power supply of a transmitter-receiver fitted to a flight data recorder placed in an aircraft, said transmitter-receiver being used to send the recorded flight data only when the aircraft is stationary.

9. The device of claim 1, further comprising an adaptor to adapt the coding logic of the input discrete state indicators to an internal coding logic of the device.

10. The device of claim 1, further comprising an adaptor to adapt the electrical interface of the input discrete state indicators to the electrical interface of the device.

11. The device of claim 1, further comprising a circuit to synthesize and send a binary cue of proper control of the three make/break switches, said cue synthesized by analysis of the consistency of the commands applied to the make/break switches and by analysis of the proper operation of a circuit to synthesize the validation command.

12. The device of claim 1, wherein the item of equipment comprises a secure equipment for turning on a power supply of a transmitter-receiver fitted to a flight data recorder placed in an aircraft, said transmitter-receiver being used to send the recorded flight data only when the aircraft is stationary.

* * * * *